Sept. 6, 1949.     A. J. BIALOUS     2,481,282
COIL-POLARITY INDICATOR
Filed Aug. 21, 1947
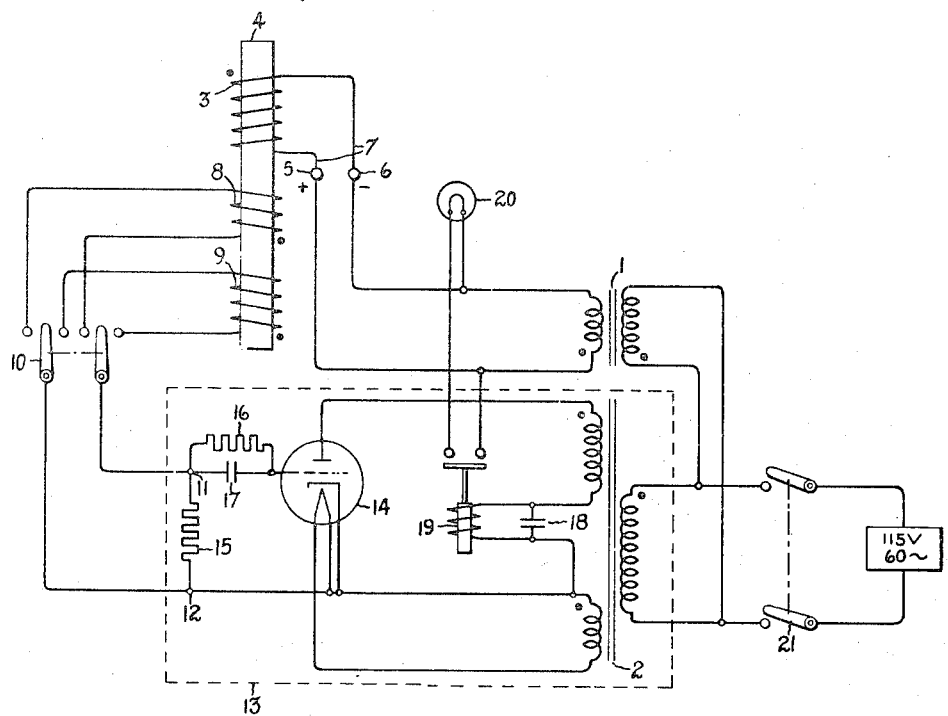
Inventor:
Adolf J. Bialous.
by *Prawell S. Mack*
His Attorney.

Patented Sept. 6, 1949

2,481,282

UNITED STATES PATENT OFFICE 2,481,282

COIL-POLARITY INDICATOR

Adolf J. Bialous, Schenectady, N. Y., assignor to General Electric Company, a corporation of New York Application August 21, 1947, Serial No. 769,917

2 Claims. (Cl. 175—183)

1

My invention relates to coil-polarity indicators and more particularly to apparatus for determining the direction of winding of a solenoid.

It is an object of my invention to provide apparatus for quickly and easily determining the polarity of a solenoid.

It is another object of my invention to provide apparatus for quickly and easily testing a solenoid to determine whether the coil is wound in the proper direction and simultaneously to determine if the coil has an open or a poor connection.

It is a further object of my invention to provide apparatus for testing solenoids which will give a visual indication of coils which are defective either because of improper winding or because of an open or poor connection.

The features of my invention which are believed to be novel and patentable will be pointed out in the claims appended thereto. For a better understanding of my invention reference is made in the following description to the accompanying drawing, in which the single figure is a circuit diagram of one form of my invention.

Referring now to the drawing, any convenient source of alternating electric power, usually a 115 volt 60 cycle or other commercial source, is represented by a block symbol and used to energize the primaries of two transformers 1 and 2. The same source must be used for both transformers to preserve proper phase relations hereinafter described. Transformer 1 is provided with a secondary winding as shown to supply an alternating voltage of about 24 volts to terminals 5 and 6. Dots placed alongside transformer windings and coils indicate points of like polarity.

The coil 3 to be tested is placed axially as shown on a magnetic rod 4, which as will appear, serves as a transformer core, and is energized by applying a low alternating voltage from terminals 5 and 6 through test leads 7. Normally coil 3 is placed on rod 4 with its "start" terminal on the bottom and connected to terminal 5, and its winding proceeding in a counter-clockwise direction when looking down on it in this position. Hereinafter a coil which may be so placed is referred to as a correctly wound coil. If both the start terminal and direction of winding are not known, it is assumed that the coil is connected as described above and the correctness of such assumption is determined by the apparatus. Windings 8 and 9 are secondary windings also axially placed on rod 4 so that

2 voltages are induced in these windings by transformer action when coil 3 is energized. Only one secondary winding is necessary for the operation of my invention, but by providing two such windings, of which one is adapted to operate with primary coils having few turns and the other is adapted to operate with primary coils having a greater number of turns, the range of coils which may be tested is extended. Additional secondary windings may be added without changing the operating principle of my invention. A switch 10 connects either winding 8 or winding 9 to the input terminals 11—12 of a phase responsive signal amplifier 13 hereinafter described. Windings 8 and 9 are wound in a clockwise direction as viewed from above, a direction reverse to that of a correctly wound coil 3, so that if the coil 3 being tested is correctly wound the voltage across terminals 11—12 will be approximately 180 degrees out of phase with the voltage across terminals 5—6. If the coil 3 tested is wound in a direction reverse to that assumed the voltage across terminals 11—12 will be in phase with the voltage across terminals 5—6, and if the coil tested has an open or a poor connection the voltage across terminals 11—12 will be zero or have a negligibly small value. Thus, the presence of a proper voltage across terminals 11—12 which is 180 degrees out of phase with the voltage across terminals 5—6 indicates that the coil tested is correctly wound and contains no open or poor connection.

The signal amplifier 13 comprises a triode vacuum tube 14, resistors 15 and 16, capacitors 17 and 18, and a magnetic relay 19, connected as shown. As will be understood by those skilled in the art, the energizing coil of relay 19 is connected in the output or place circuit of the signal amplifier. An indicator lamp 20 is connected in series with the secondary of transformer 1 and the contacts of relay 19 as shown, so that the lamp is lighted when relay 19 is energized. The plate to cathode voltage across vacuum tube 14 is obtained from the secondary of transformer 2 and the connections are such that it is in phase with the voltage across terminals 5—6. The cathode of tube 14 is heated from another secondary winding of transformer 2, as shown. The tube is normally conductive with zero grid bias voltage so that if the voltage across terminals 11—12 is zero or also in phase with the voltage across terminals 5—6, plate current will flow through vacuum tube 14, thus energizing relay 19 and causing lamp 20 to be lighted. If, however, the voltage across terminals 11—12 is 180 degrees out-of-phase with the voltage across terminals 5—6, as it will be whenever the coil 3 tested is correctly wound and contains no open or poor connection, the grid of vacuum tube 14 will be driven negative at the same time that the plate becomes positive, thus reducing the plate current so that relay 19 is deenergized and lamp 20 goes out. Thus a visual indication is obtained which shows whether the coil tested is correctly wound or defective. If desired, the relay contacts can be altered so that the indicating lamp is lighted when the relay is deenergized, and goes out when the relay is energized.

I provide capacitor 18 connected in parallel with the energizing coil of relay 19 to by-pass alternating current so that a continuous direct current flows through the coil of relay 19, which current is equal to the average plate current through vacuum tube 14. This permits the use of a D.-C. relay and improves the operation of the apparatus. Switch 21 provides for disconnecting the source of electric power when the apparatus is not in use.

I prefer to make vacuum tube 14 a triode having a grid circuit comprising resistors 15 and 16 and capacitor 17 connected as shown, but other vacuum tube amplifier circuits which are well known to those skilled in the art will also give good results. The grid circuit shown provides a grid-leak bias for vacuum tube 14 which gives a high phase sensitivity and allows a wide range of turn-ratios between the test and secondary coils.

It a correctly wound test coil placed upon rod 4 as specified above were energized with a direct current, the north pole of the coil would be up if terminal 5 were a positive terminal and terminal 6 were a negative terminal. It may thus be convenient to mark terminal 5 "+," and to mark terminal 6 "—." It may also be desirable to provide steel rods 4 of several different diameters to accommodate different size coils.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Coil testing apparatus comprising a set of electric terminals to which a coil to be tested may be connected, a winding positioned for magnetic flux linking relation with the coil to be tested, a second set of electric terminals connected to said winding, a vacuum-tube signal amplifier having an input and an output or plate circuit, connections to apply alternating voltages to one of said sets of terminals and the plate circuit of said amplifier respectively, such voltages being in phase opposition to each other, connections from the other of said sets of terminals to the input of said amplifier, a relay having its energizing coil connected in the output circuit of said amplifier, and an indicator connected in series with the contacts of said relay.

2. Coil testing apparatus comprising a magnetic rod adapted to receive axially thereon a coil to be tested, a set of electric terminals to which the coil to be tested may be connected, a first transformer having its secondary connected to said set of electric terminals, a winding upon said magnetic rod, a vacuum-tube signal amplifier having an input and an output or plate circuit, the input of said amplifier being connected to said winding, a relay having its energizing coil connected in the plate circuit of said amplifier, a second transformer having a secondary connected in the plate circuit of said amplifier and in series with the energizing coil of said relay and having a primary connected in parallel with the primary of said first transformer, and an indicator connected in series with the contacts of said relay across the secondary of said first transformer.

ADOLF J. BIALOUS.

REFERENCES CITED

The following references are of record in the file of this patent:

UNITED STATES PATENTS

| Number | Name | Date |
|---|---|---|
| 1,588,539 | Fortescue | June 15, 1926 |

OTHER REFERENCES

Publication, "A Balance-Detector for Alternating-Current Bridges," by Cosens in Proceedings of Phys. Society, vol. 46, 1934, pages 818 to 823.

Publication, "Testing Power Transformers" by Isaacson in Radio News for May 1931.